(12) United States Patent
Ditzel et al.

(10) Patent No.: US 7,028,881 B2
(45) Date of Patent: Apr. 18, 2006

(54) METHOD FOR PROVIDING REMOVABLE WELD BACKING

(75) Inventors: Peter J. Ditzel, Orlando, FL (US); Paul J. Zombo, Cocoa, FL (US)

(73) Assignee: Siemens Power Generation, Inc., Orlando, FL (US)

(*) Notice: Subject to any disclaimer, the term of this patent is extended or adjusted under 35 U.S.C. 154(b) by 230 days.

(21) Appl. No.: 10/666,215

(22) Filed: Sep. 18, 2003

(65) Prior Publication Data

US 2005/0061858 A1    Mar. 24, 2005

(51) Int. Cl.
*B23K 5/22* (2006.01)
*B23K 31/02* (2006.01)

(52) U.S. Cl. .................. 228/216; 228/215; 228/50

(58) Field of Classification Search ............. 228/215, 228/216, 50
See application file for complete search history.

(56) References Cited

U.S. PATENT DOCUMENTS

| | | | |
|---|---|---|---|
| 2,320,700 A * | 6/1943 | Kent et al. ............... 228/216 |
| 2,466,562 A * | 4/1949 | Steinberger ............. 228/182 |
| 2,743,515 A * | 5/1956 | Davis et al. ............. 228/216 |
| 2,847,958 A * | 8/1958 | Norton, Jr. et al. ...... 228/50 |
| 3,110,103 A * | 11/1963 | Davey ..................... 228/164 |
| 3,338,499 A * | 8/1967 | Gilbert .................... 228/57 |
| 3,551,995 A * | 1/1971 | Marechal ................. 228/183 |
| 3,825,984 A * | 7/1974 | Linko et al. ............ 29/889.721 |
| 3,940,048 A | 2/1976 | Casey |
| 4,088,503 A | 5/1978 | Demin et al. |
| 4,295,593 A | 10/1981 | Kensrue |
| 4,337,387 A | 6/1982 | Hockney |
| 4,344,556 A * | 8/1982 | Knapp ..................... 228/50 |
| 4,465,220 A | 8/1984 | Ledlow et al. |
| 4,759,957 A | 7/1988 | Eaton et al. |
| 4,866,236 A | 9/1989 | DeNale et al. |
| 5,158,225 A | 10/1992 | Ksioszk et al. |
| 5,395,142 A | 3/1995 | Horn et al. |
| 5,449,107 A | 9/1995 | Umeno et al. |
| 5,451,741 A | 9/1995 | Doronin et al. |
| 5,726,408 A | 3/1998 | Easterday |
| 6,484,924 B1 | 11/2002 | Forrest |
| 2001/0048020 A1 | 12/2001 | Kuriyama et al. |
| 2002/0109003 A1 | 8/2002 | Parker et al. |

* cited by examiner

*Primary Examiner*—Lynne R. Edmondson

(57) ABSTRACT

Method for welding objects having limited backside access to a cavity behind a region to be welded. The method includes inserting a fugitive backing material in an installation state into a first portion of the cavity proximate the region to be welded and then transforming the fugitive backing material to a rigid state. The method further includes forming a weld in the region and then transforming the fugitive backing material to a removable state and removing the fugitive backing material from the cavity. The method may also include placing a pre-formed weld backing in the cavity and filling the cavity with a fugitive backing material. The method further includes transforming the fugitive backing material to a rigid state, forming a weld, and transforming the fugitive backing material to a removable state. The method may further include removing the fugitive backing material and removing the pre-formed weld backing from the cavity.

28 Claims, 1 Drawing Sheet

METHOD FOR PROVIDING REMOVABLE WELD BACKING

FIELD OF THE INVENTION

This invention relates generally to the field of welding, and, more particularly, to a method for welding objects having a restricted access region behind a region to be welded.

BACKGROUND OF THE INVENTION

Weld backings are used to temporarily provide support for weld material deposited in a region being welded, to prevent, for example, a weld root from sagging below the welded region. An uncontrolled weld root may result in varying weld thickness and sharp notches in the weld requiring further machining that may be difficult and time consuming to perform. Furthermore, complex weld root profiles may be difficult to obtain without the use of a weld backing. Typically, a mechanical support is used for holding a heat resistant material against a backside of a region to be welded. Once the weld has cooled sufficiently, the backing can be removed, leaving a smooth weld root. Typically, ceramics, fiberglass tape, solid metal, and weld metal deposited using a tungsten gas process are used for weld backings. However, irregularly shaped objects having restricted access to the backside of regions to be welded pose problems when attempting to provide weld backings in a conventional manner. In particular, objects having relatively complex structures defining irregular cavities with restricted access have been difficult to weld while maintaining a desired weld root profile.

BRIEF DESCRIPTION OF THE DRAWINGS

The invention will be more apparent from the following description in view of the drawings that show.

DETAILED DESCRIPTION OF THE INVENTION

Figure 1:
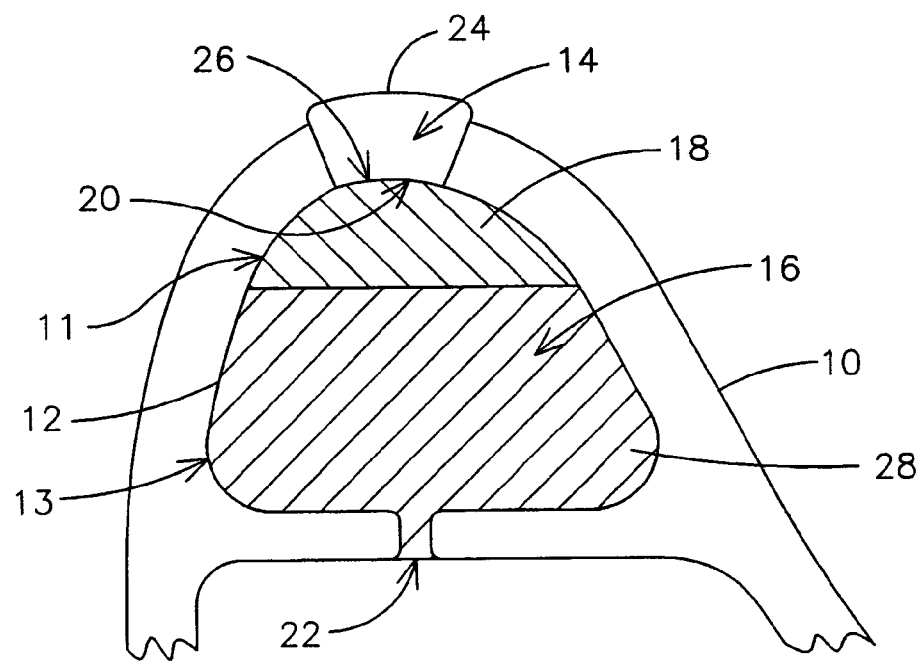
FIG. 1 is a partial cross-sectional view of an object having a confined access region filled with a removable backing material.

The inventors of the present invention have innovatively realized that welding of objects having backside access that is restricted by a structure defining a cavity may be accomplished by at least partially filling the cavity proximate a region to be welded with a fugitive backing material. For purposes of this invention, the term fugitive backing material means a type of material that is provided at one stage of fabrication, a state of material is changed, a fabrication step is performed, the state of the material is changed a second time, and the material is subsequently removed by a process during a later stage of fabrication. Generally, a method of welding such objects includes filling at least a portion of the cavity directly below the region with a fugitive backing material, welding the region, and then removing the fugitive backing material from the cavity. FIG. 1 is a partial cross-sectional view of an exemplary object 10 having a limited backside access region restricted by structure defining a cavity 12 below a region 14 to be welded. Prior to welding, the cavity 12 may be filled with a removable, or fugitive, backing material 16. In an aspect of the invention, the cavity 12 may include an opening 22 positioned remote from the region 14 to be welded, to allowing removal of the fugitive backing material 16 through the opening 22 after welding. For example, restricted backside access objects requiring welding repair, such as turbine blades, turbine vanes, or turbine transition panels, may include cooling hole openings allowing limited backside access to a cavity to allow removal of a fugitive backing material after welding.

In one form, the fugitive backing material 16 may include a fusible material, such as metal powder or a brazing compound. Accordingly, a portion of the fusible material 16 facing the region 14 to be welded may become part of a weld 24 after welding of the region 14 is complete. In another aspect, the fugitive backing material 16 may include a refractory material, such as fused silica, alumina, or quartz, that does not become a part of the weld 24 during welding and, therefore, may be completely removed from the cavity after welding.

A powdered material may be used for the fugitive backing material 16. For example, the object 10 may be positioned so that the region 14 to be welded opens in an upward direction. The cavity 12 may then be filled with the powdered material and the region 14 welded, such as by laser or electron beam welding. If necessary, a plug may be provided to block the opening 22 to prevent the powdered material from exiting the opening 22 under the force of gravity. In an aspect of the invention, the powdered material may be compacted in the cavity 12. The inventors have experimentally determined that a welding process such as gas tungsten arc or plasma arc welding may require the use of a binder mixed with the powdered backing material to provide a fugitive backing material 16 that is less likely to be displaced than a powdered material when welding. For example, a binder such as sodium silicate or hydrolyzed ethyl silicate may be added to the powdered material to achieve a desired viscosity, so that the mixed material remains in place after being packed in the cavity 12. Accordingly, the mixed material may be mixed to a desired viscosity suitable for packing into the cavity 12 without extending into the region 14 to be welded regardless of the orientation of the object with respect to gravity. The mixed material may be prevented from extending into the region 14 to be welded during packing, such as by a plug conforming to the dimension of the weld region. After the plug is removed, the mixed material may retain its packed configuration without extruding into the region 14. In an aspect of the invention, a liquid form of the binder may be mixed with the powdered material to create a relatively higher viscosity mixture that may be poured into the cavity and allowed to harden into a solid state.

After the cavity 12 has been filled with the fugitive backing material 16, the region 14 may be welded so that a weld root 26 of a weld 24 assumes the profile of a surface 20 of the fugitive backing material 16 exposed to the region 14 to be welded. After welding of the region 14, the fugitive backing material may then be removed through the opening 22, for example, by a chemical leaching process as would be appreciated by a skilled artisan. The leaching process may include injecting, into the filled cavity 12, a chemical capable of reducing the viscosity of the fugitive backing material 16 so that the fugitive backing material 16 may be made to flow out of the cavity 12 through the opening 22. In the case of a powdered material, the material may be simply removed by orienting the object so that the force of gravity causes the material to flow out through the opening 22. After removal of the fugitive backing material 16, the cavity may be flushed with, for example, steam, water, or compressed air to ensure that fugitive backing material 16 is thoroughly removed. In addition, if a material, such as fused silica, is used as a fugitive backing material 16, a chemical etching process, as known in the art, may be used to remove any remaining material from the cavity 12.

The above process may be further explained in terms of states of the fugitive backing material during the steps of the process. For example, an installation state of the fugitive backing material may include states such as a loose granular state, a liquid state, or a paste state, so that insertion of the fugitive backing material into the cavity of is easy to accomplish. A rigid state, for example, existing after transformation from the installation state, may include a gravity held state, a compacted state, a hardened state, or a cured state sufficiently rigid for supporting weld formation. A removable state may include the resulting state of the fugitive backing material after a process of, for example, melting, sublimation, dissolving, or releasing pressure or a resistance to gravity, so that the fugitive backing material is made easy to remove.

In another aspect of the invention, the fugitive backing material 16 may comprise multiple layers of material. For example, the object 10 may be positioned so that the opening 22 opens in an upward direction (that is, inverted from the view shown in FIG. 1, so that the region 14 to be weld is at the bottom of the figure). A first layer 18 of a fugitive backing material 16, such as described above, may then be placed, for example, via the opening 22, in a first portion 11 of the cavity 12 adjacent to the region 14 to be welded so that a second portion 13 remains void. If necessary, a plug may be provided to block the opening 22 to prevent the fugitive backing material 16 from exiting the region 14. The first layer 18 may then be compacted in the cavity 12. A second layer 28 of fugitive backing material 16, such as metal powder, alumina, or wax, may then be added via the opening 22 to a second portion 12 of the cavity remaining void above the first layer 18. The second layer 28 may then be compacted in the cavity 12. Advantageously, the second layer 28 may be protected from a welding process by the first layer 18, so that a backing material having a lower melting point than the material used in the first layer 18 may be used. Accordingly, a material such as wax may be used, allowing removal of the second layer 28 of material from the cavity 12 using, for example, a sublimation, dissolving, or melting process, instead of a chemical leaching process that may be required with other materials. After the cavity 12 is filled with the second layer 28, the region 14 may be welded, and the fugitive backing material 16 may removed after welding. The second layer 28 may be removed from the cavity 12 using a removal process appropriate for the type of material used. After the second layer 28 is removed, the first layer 18 may then be removed using a removal process appropriate for the material forming the first layer 18.

Figure 2:
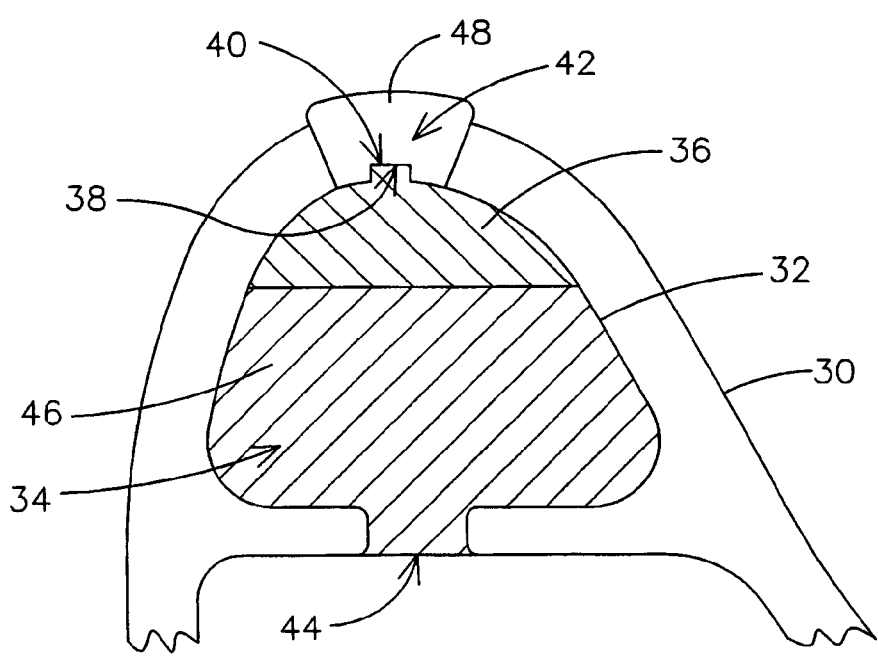
FIG. 2 is a partial cross-sectional view of an object having a confined access region filled with a removable backing including a pre-formed weld backing.

In another aspect, a fugitive, pre-formed weld backing may be placed in a first portion of a cavity directly under a region to be welded, and a second portion of the cavity directly under the pre-formed weld backing may be filled with a fugitive filler. FIG. 2 is a partial cross-sectional view of an object 30 having a confined access region, or cavity 32 filled with a fugitive backing 34 including a pre-formed weld backing 36 adjacent to a region 42 to be welded. The pre-formed weld backing 36 may be sufficiently rigid so that it maintains its shape when installed in the cavity 32. As shown in FIG. 2, the pre-formed weld backing 36 may comprise an upper surface 38 having a shape complementary to a desired shape of a weld root 40. Accordingly, relatively complex profiles, such as may be required in an interior portion of a turbine blade or vane having turbulators or cooling passages adjacent to a region to be welded, may be formed in the weld root 40 using the pre-formed weld backing 36. In an aspect of the invention, the pre-formed weld backing 36 may be formed from a refractory material, such as silicate glass, quartz glass, or other materials known for use in casting. The pre-formed weld backing 36 may be sized so that it can be removed intact from the an opening 44 in the cavity 32 after welding, or be formed from a refractory material capable of being removed from the cavity 32, for example, by chemical leaching. In an aspect of the invention, the pre-formed backing 36 may be held in place adjacent the region to be welded 42 by a fugitive filler 46, for example, comprising the same material as used in the second layer 28 of FIG. 1 described above. The fugitive filler 46 may be held in place by gravity during welding, or may be mixed with a binder, as described earlier, for packing into the cavity 32, thereby allowing welding from any angle. After the region 42 is welded, the fugitive filler 46 may be removed from the opening 44, followed by removal of the pre-formed backing 36, leaving a weld 48 with a weld root 40 having a shape complementary to the upper surface 38 of the pre-formed weld backing 36.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method for welding objects having limited backside access to a cavity behind a region to be welded, the method comprising:
    inserting a fugitive backing material comprising a fusible material in an installation state into a first portion of the cavity proximate the region to be welded;
    transforming the fugitive backing material to a rigid state;
    forming a weld in the region so that a first portion of the fusible material facing the region becomes part of the formed weld; and
    transforming a second portion of the fugitive backing material remaining unwelded to a removable state and removing the second portion from the cavity.

2. The method of claim 1, wherein transforming the fugitive backing material to a rigid state comprises compacting the fugitive backing material.

3. The method of claim 1, wherein transforming the fugitive backing material to a rigid state comprises curing the fugitive backing material.

4. The method of claim 1, wherein transforming the fugitive backing material to a rigid state comprises hardening the fugitive backing material.

5. The method of claim 1, wherein transforming the fugitive backing material to a rigid state comprises allowing gravity to hold the fugitive backing material in a desired position.

6. The method of claim 1, further comprising preventing the fugitive backing material from extending into the region to be welded while inserting the fugitive backing material into the cavity.

7. The method of claim 1, further comprising preventing the fugitive backing material from extending into the region to be welded while transforming the fugitive backing material to a rigid state.

8. The method of claim 1, wherein the fusible material comprises one of the group consisting of a metal powder and a brazing compound.

9. The method of claim 1, further comprising:
mixing particles of the fugitive backing material with a binder to form a paste;
inserting the paste in the cavity; and
allowing the paste to harden.

10. The method of claim 9, wherein the binder comprises one of the group consisting of sodium silicate and hydrolyzed ethyl silicate.

11. The method of claim 1, further comprising filling a second portion of the cavity with a second fugitive backing material.

12. The method of claim 1, further comprising transforming the fugitive backing material to a comparatively more viscous state after inserting it into the cavity.

13. The method of claim 1, further comprising transforming the second portion of the fugitive backing material to a comparatively less viscous state after welding.

14. The method of claim 13, further comprising removing the second portion of the fugitive backing material from the cavity after transforming it into a comparatively less viscous state.

15. The method of claim 1, wherein transforming the second portion of the fugitive backing material to a removable state comprises a process of chemical leaching.

16. The method of claim 1, wherein transforming the second portion of the fugitive backing material to a removable state comprises a process of melting.

17. The method of claim 1, wherein transforming the second portion of the fugitive backing material to a removable state comprises a process of sublimation.

18. The method of claim 1, wherein transforming the second portion of the fugitive backing material to a removable state comprises a process of dissolving.

19. The method of claim 1, wherein transforming the second portion of the fugitive backing material to a removable state comprises a process of releasing a force compacting the fugitive backing material.

20. The method of claim 1, wherein transforming the second portion of the fugitive backing material to a removable state comprises a process of flushing the fugitive backing material out of the cavity.

21. The method of claim 1, wherein transforming the second portion of the fugitive backing material to a removable state comprises a process of allowing gravity to act on the fugitive backing material.

22. A method for welding objects having limited backside access to a cavity behind a region to be welded, the method comprising:
placing a pre-formed weld backing in the cavity directly adjacent the region to be welded;
at least partially filling a portion of the cavity with a fugitive backing material to provide support for the pre-formed backing;
forming a weld in the region;
transforming the fugitive backing material to a removable state and removing the fugitive backing material from the cavity; and
removing the pre-formed weld backing from the cavity.

23. The method of claim 22, further comprising transforming the fugitive backing material to a rigid state by one of the group consisting of compacting, curing, hardening, and allowing gravity to hold the fugitive backing material in a desired position after at least partially filling the portion of the cavity with the fugitive backing material.

24. The method of claim 22, wherein the fugitive backing material is one of the group consisting of a metal powder, alumina, silica, quartz, and wax.

25. The method of claim 22, wherein the fugitive backing material is removed by a process of dissolving.

26. The method of claim 22, wherein The fugitive backing material is removed by a process of:
heating the fugitive backing material to a melting temperature; and
allowing the fugitive backing material to flow from an opening in the cavity.

27. The method of claim 22, wherein the fugitive backing material is removed by a process of sublimation.

28. The method of claim 22, wherein the fugitive backing material is removed by liquefying the fugitive backing material.

* * * * *